No. 836,312. PATENTED NOV. 20, 1906.
J. FISK.
RIDING ATTACHMENT FOR ONE ROW WALKING GRAIN AND SEED PLANTERS.
APPLICATION FILED FEB. 5, 1906.
2 SHEETS—SHEET 1.
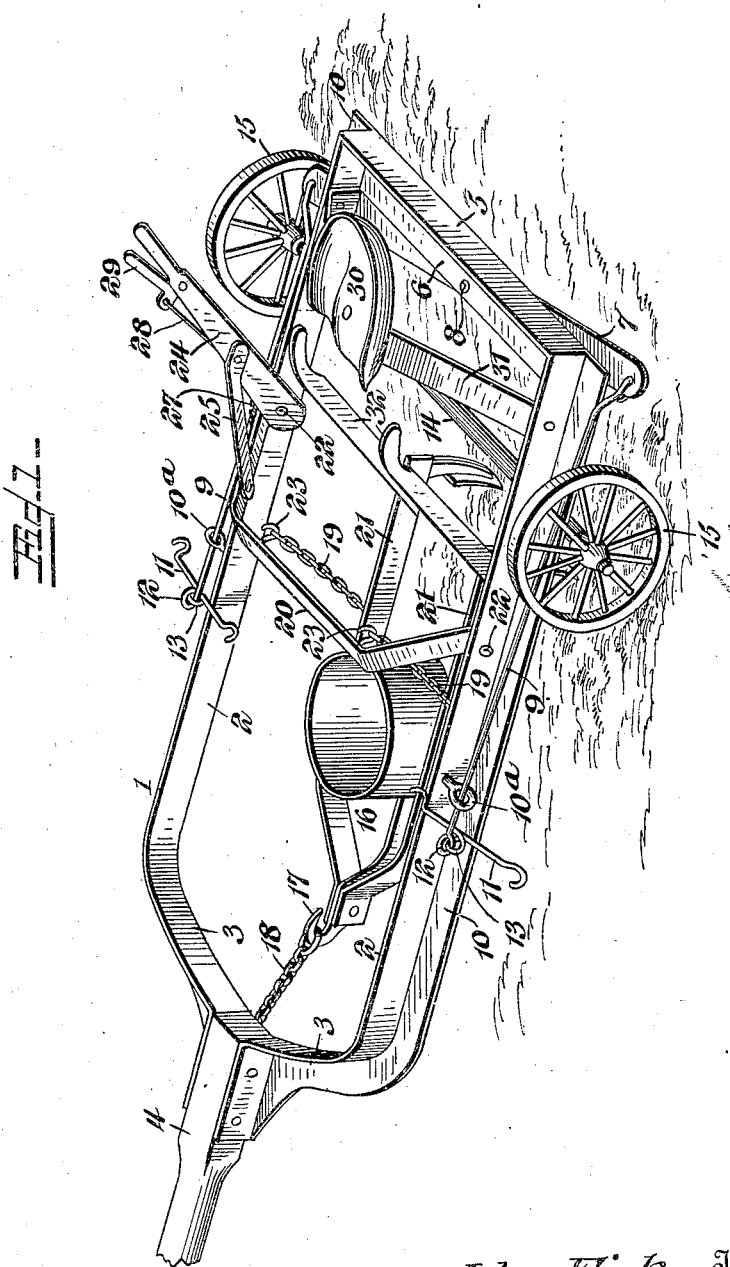
Witnesses
Chas. H. Durand
J. F. Riley
John Fisk, Inventor,
By C. G. Siggers.
Attorney No. 836,312. PATENTED NOV. 20, 1906.
J. FISK.
RIDING ATTACHMENT FOR ONE ROW WALKING GRAIN AND SEED PLANTERS.
APPLICATION FILED FEB. 5, 1906.
2 SHEETS—SHEET 2.
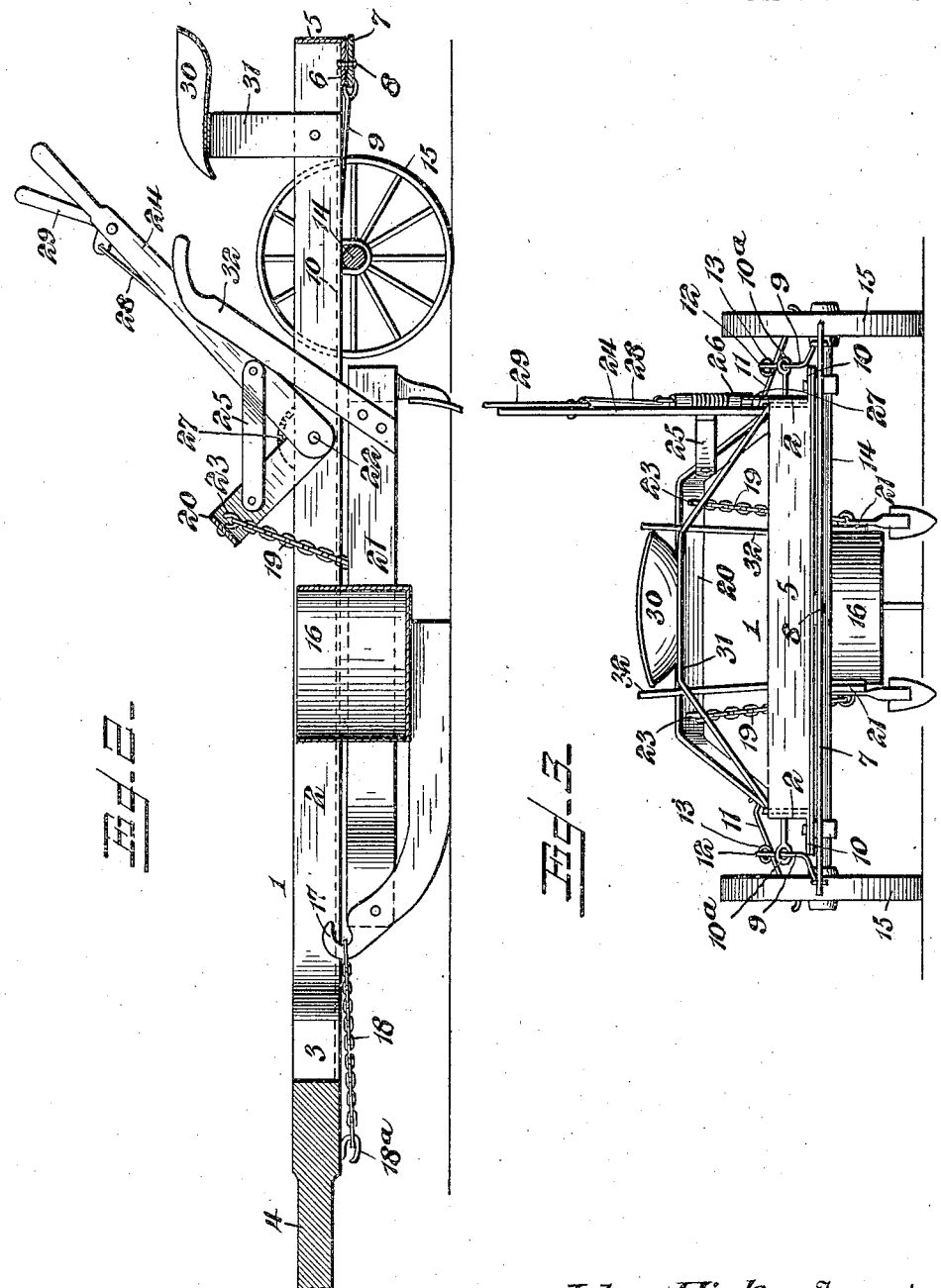
John Fisk, Inventor,
Witnesses

UNITED STATES PATENT OFFICE.

JOHN FISK, OF HOUSTON, TEXAS.

RIDING ATTACHMENT FOR ONE-ROW WALKING GRAIN AND SEED PLANTERS.

No. 836,312.      Specification of Letters Patent.      Patented Nov. 20, 1906.

Application filed February 5, 1906. Serial No. 299,673.

*To all whom it may concern:*

Be it known that I, JOHN FISK, a citizen of the United States, residing at Houston, in the county of Harris and State of Texas, have invented a new and useful Riding Attachment for One-Row Walking Grain and Seed Planters, of which the following is a specification.

The invention relates to a riding attachment for one-row walking seeders and planters.

The object of the present invention is to provide an attachment for one-row walking seeders and planters adapted to convert the same into a riding seeder and planter and capable of enabling the seeder and planter to which it is applied to be adjusted bodily for enabling the same to operate at the desired depth and also to raise the same above the ground when turning the machine at the end of a row and when transferring the same from one field or place to another.

With these and other objects in view the invention consists in the construction and novel combination of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of an attachment constructed in accordance with this invention and illustrating the manner of applying the same to a one-row walking seeder and planter. Fig. 2 is a longitudinal sectional view. Fig. 3 is an end view.

Like numerals of reference designate corresponding parts in all the figures of the drawings.

1 designates a main frame of approximately rectangular form composed of sides 2, having parallel spaced portions and provided with transversely-disposed forwardly-converging front portions 3, which are secured to a tongue or pole 4 at opposite sides of the rear end thereof. The main frame is preferably constructed of angle-iron, and the rear ends of the side bars are connected by an angle-iron cross-piece 5, having a horizontal bottom flange 6, to which is pivoted a doubletree 7. The doubletree 7, which is secured to the rear cross-bars of the main frame by means of a bolt or other suitable fastening device 8, is connected at its ends to longitudinal rods 9, which are located on the exterior of the side bars of the main frame. The side bars 2 are provided with exteriorly-projecting horizontal flanges or portions 10, and the front portions of the rods pass through guides 10$^a$ and have swingletrees 11 secured to their front ends. The guides 10$^a$ preferably consist of eyebolts, and the rods are provided at their front ends with eyes 12, which are linked into eyes 13 of the swingletrees. The swingletrees are adapted to receive the traces of a pair of horses or other draft-animals which are hitched to the machine at opposite sides of the tongue or pole.

The rear portion of the frame is mounted upon an axle 14, which is provided at its end with suitable spindles for the reception of wheels 15, that support the rear portion of the main frame.

Within the opening of the main frame is arranged a one-row walking seeder and planter 16, which is provided at its front with a clevis 17 and which is adjustably connected by a short chain 18 or other suitable flexible connection with a hook 18$^a$ of the tongue or pole. The clevis 17 is also in the form of a hook; but any other suitable means may be employed for securing the flexible connection to the front of the frame and to the front of the seeder and planter.

The present invention is designed to convert a walking seeder and planter into a riding-machine, and as the particular construction of the seeder and planter does not constitute any portion of the present invention it is not deemed necessary to illustrate the details of the seed-dropping mechanism.

The rear portion of the seeder and planter is flexibly connected by a pair of short chains 19 with an oscillatory arch 20, forming a swinging member, and is adapted to raise and lower the seeder and planter. The chains 19 are suitably secured at their lower ends to the beams or side pieces 21 of the seeder and planter, and the arch 20, which is pivoted at its ends by bolts 22 or other suitable fastening devices to the sides of the main frame, is provided at opposite sides of its top portion with hooks 23, which engage the upper ends of the chains 19. This permits an adjustment of the seeder and planter independently of the operating mechanism for adjusting and oscillating the pivoted arch. The pivoted arch is adjusted to raise and lower the planter by means of an operating-lever 24, fulcrumed on the pivot-bolt 22 and connected with the arch by a link 25. The lever 24 is provided with a spring-actuated dog or detent 26, which is arranged to engage a toothed segment 27. The toothed segment, which forms a ratchet, is suitably secured to the vertical flange or portion of the contiguous side of the main or supporting frame. The spring-actuated dog or detent is connected by a rod 28 with a latch-lever 29, located adjacent to the handle or grip of the operating-lever 24. The lever 24 is adapted to be operated to oscillate the arch, and thereby raise or lower the planter. This adjustment enables the planter or other machine to which the attachment is applied to be arranged to operate at the desired depth and also to be lifted above the ground to throw such planter or other machine out of operation when turning at the end of a row or when moving the machine from one field or place to another.

The attachment is provided at the rear portion of the frame with a seat 30, supported by a fixed transversely-disposed arched bar 31 and arranged in rear of the handle 32 of the seeder and planter. The arched bar, which extends transversely of the frame, has its terminals suitably secured to the sides of the same.

Having thus fully described my invention, what I claim as new, and desire to secure by Letters Patent, is —

1. An attachment of the class described comprising a main or supporting frame having an opening to receive a seeder and planter, means for movably connecting the seeder and planter with the front of the frame, an arched member pivotally mounted on and extending across the main or supporting frame, means for suspending the rear portion of the seeder and planter from the top of the arched member, and means for adjusting the latter.

2. An attachment of the class described comprising a main or supporting frame having an opening to receive a seeder and planter, an arched member pivotally mounted on and extending across the main or supporting frame, flexible connections for suspending the seeder and planter from the top of the arched member, said flexible connections being adjustable, and operating mechanism for oscillating the pivoted member.

3. An attachment of the class described comprising a main or supporting frame having an opening to receive a seeder and planter, an arch pivotally mounted on and extending across the main or supporting frame, means for suspending the seeder and planter from the arch, an operating-lever connected with the arch for oscillating the same, and means for securing the lever to its adjustment.

4. An attachment of the class described comprising a main or supporting frame, means carried by the main or supporting frame for suspending a seeder and planter or other machine within it, a doubletree pivotally mounted on the frame at the rear end thereof, and draft devices located exteriorly of the main or supporting frame and connected with the ends of the doubletree.

5. An attachment of the class described comprising a main or supporting frame, means carried by the main or supporting frame for suspending a seeder and planter within it, a doubletree pivotally mounted on the frame at the rear end thereof, rods located at opposite sides of and guided on the frame and swingletrees connected with the rods.

6. An attachment of the class described comprising a wheeled frame having an opening to receive a seeder and planter and provided with a seat, a doubletree pivoted to the frame at the rear end thereof, side rods connected at their rear ends to the doubletree and arranged exteriorly at the sides of the main or supporting frame, and swingletrees secured to the front ends of the rods.

JOHN FISK.

Witnesses:
J. C. IDESON,
F. LAW. HANDERSON.